US010061602B2

(12) United States Patent
Mousseau

(10) Patent No.: US 10,061,602 B2
(45) Date of Patent: Aug. 28, 2018

(54) SYSTEM AND METHOD FOR PROVIDING A VIRTUAL ASSEMBLY BUILDER FOR USE WITH A CLOUD COMPUTING ENVIRONMENT

(71) Applicant: Oracle International Corporation, Redwood Shores, CA (US)

(72) Inventor: Richard P. Mousseau, Stratham, NH (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 22 days.

(21) Appl. No.: 14/020,598

(22) Filed: Sep. 6, 2013

(65) Prior Publication Data

US 2014/0075437 A1 Mar. 13, 2014

Related U.S. Application Data

(60) Provisional application No. 61/800,253, filed on Mar. 15, 2013, provisional application No. 61/698,453, filed on Sep. 7, 2012, provisional application No. 61/698,470, filed on Sep. 7, 2012.

(51) Int. Cl.
*G06F 9/455* (2018.01)
*G06F 9/46* (2006.01)
*G06F 8/61* (2018.01)

(52) U.S. Cl.
CPC ...... *G06F 9/45533* (2013.01); *G06F 9/45537* (2013.01); *G06F 9/467* (2013.01); *G06F 8/61* (2013.01)

(58) Field of Classification Search
CPC .......... G06F 9/45533; G06F 8/61; G06F 8/63; G06F 2009/45562
See application file for complete search history.

(56) References Cited

U.S. PATENT DOCUMENTS

2008/0134175 A1* 6/2008 Fitzgerald et al. ............... 718/1
2009/0288084 A1* 11/2009 Astete et al. ..................... 718/1
2010/0325191 A1* 12/2010 Jung ....................... G06F 15/16
  709/202

(Continued)

OTHER PUBLICATIONS

Thanawala, et al., Oracle SaaS Platform: Building On-Demand Applications; An Oracle White Paper, Sep. 2008, 21 pages.

(Continued)

*Primary Examiner* — Jacob D Dascomb
(74) *Attorney, Agent, or Firm* — Tucker Ellis LLP

(57) ABSTRACT

A system and method for providing a virtual assembly builder for use with a cloud computing environment. In accordance with an embodiment, the system can include a virtual assembly builder component which maintains a repository of virtual assembly archives, wherein each virtual assembly can include a metadata and one or more virtual machine templates that can be used to instantiate an instance of the assembly; and a virtual assembly builder deployer provided as a web service or other interface, which enables operations for uploading virtual assemblies to the repository, registering virtual assemblies with cloud components, and/ or managing deployment instances defined by an assembly.

20 Claims, 8 Drawing Sheets

(56) References Cited

U.S. PATENT DOCUMENTS

| | | | | |
|---|---|---|---|---|
| 2011/0154320 | A1* | 6/2011 | Verma | G06F 8/63 718/1 |
| 2012/0030672 | A1* | 2/2012 | Zygmuntowicz | G06F 8/60 718/1 |
| 2012/0233668 | A1* | 9/2012 | Leafe | G06F 9/44526 726/4 |
| 2013/0247034 | A1* | 9/2013 | Messerli | 718/1 |
| 2013/0290952 | A1* | 10/2013 | Childers, Jr. | G06F 9/5077 718/1 |

OTHER PUBLICATIONS

Piech, Platform-as-a-Service Private Cloud with Oracle Fusion Middleware, An Oracle White Paper, Oct. 2009, 20 pages.

Unknown Author, Cost Effective Security and Compliance with Oracle Database 11g Release 2, An Oracle White Paper, Mar. 2011, 14 pages.

Joshi, et al., Bridging the Divide between SaaS and Enterprise Datacenters, An Oracle White Paper, Feb. 2010, 18 pages.

McKendrick, Privatizing the Cloud, Oct. 2010, 33 pages, IOUG Survey on Cloud Computing.

Glas, et al., Achieving the Cloud Computing Vision, An Oracle White Paper in Enterprise Architecture, Oct. 2010, 22 pages.

Venkataraman, et al., Oracle's Cloud Solutions for Public Sector, An Oracle White Paper, Apr. 2011, 28 pages.

Unknown Author, Creating a Self-Service Dev/Test Cloud, A Case Study from Oracle Product Development IT, An Oracle White Paper, Jul. 2011, 12 pages.

Unknown Author, Oracle Exadata Database Machine, Security Overview, 2011, 2 pages.

Chauhan, et al., On-Demand Sourcing: Driving Costs Down and Value Up in a Period of Increased Business Volatility, Jun. 11, 2010, 5 pages.

Unknown Author, Oracle Identity Management 11g, 2010, 4 pages.

Silverstein, et al., Architectural Strategies for IT Optimization: From Silos to Clouds, An Oracle White Paper on Enterprise Architecture, May 2010, 21 pages.

Unknown Author, Oracle Optimized Solution for Enterprise Cloud Infrastructure, An Oracle Technical White Paper, Jun. 2011, 32 pages.

Wang, Oracle Cloud Computing, An Oracle White Paper, Jun. 2011, 16 pages.

Gulati, Cloud Management Using Oracle Enterprise Manager 11g, An Oracle White Paper, Apr. 2010, 25 pages.

Unknown Author, Accelerating Enterprise Cloud Infrastructure Deployments, 2011, 4 pages.

Wahl, et al., Oracle Advanced Security with Oracle Database 11g Release 2, Oracle White Paper, Oct. 2010, 12 pages.

Unknown Author, Reduce TCO and Get More Value from your X86 Infrastructure, 2011, 4 pages.

Unknown Author, Oracle Offers ISVs Comprehensive Platform to Deliver SaaS Applications, 2008, 2 pages.

Kumar, et al., The Most Complete and Integrated Virtualization: From Desktop to Datacenter, An Oracle White Paper, Oct. 2010, 13 pages.

* cited by examiner

SYSTEM AND METHOD FOR PROVIDING A VIRTUAL ASSEMBLY BUILDER FOR USE WITH A CLOUD COMPUTING ENVIRONMENT

CLAIM OF PRIORITY

This application claims the benefit of priority to U.S. Provisional Patent Application titled "SYSTEM AND METHOD FOR PROVIDING JAVA CLOUD SERVICES FOR USE WITH A CLOUD COMPUTING ENVIRONMENT", Application No. 61/800,253, filed Mar. 15, 2013; U.S. Provisional Patent Application titled "SYSTEM AND METHOD FOR PROVIDING A CLOUD COMPUTING ENVIRONMENT", Application No. 61/698,453, filed Sep. 7, 2012;and U.S. Provisional Patent Application titled "SYSTEM AND METHOD FOR PROVIDING A CLOUD COMPUTING ENVIRONMENT", Application No. 61/698,470 filed Sep. 7, 2012, each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to cloud computing environments, and in particular systems and methods for providing a virtual assembly builder for use with a cloud computing environment.

BACKGROUND

The term "cloud computing" is generally used to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been previously provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include:

Software as a Service (SaaS), in which consumers use software applications that are running upon a cloud infrastructure, while a SaaS provider manages or controls the underlying cloud infrastructure and applications.

Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment).

Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer).

The above examples are provided to illustrate some of the types of environment within which embodiments of the invention can generally be used. In accordance with various embodiments, the systems and methods described herein can also be used with other types of cloud or computing environments.

SUMMARY

Described herein is a system and method for providing a virtual assembly builder for use with a cloud computing environment. In accordance with an embodiment, the system can include a virtual assembly builder component which maintains a repository of virtual assembly archives, wherein each virtual assembly can include a metadata and one or more virtual machine templates that can be used to instantiate an instance of the assembly; and a virtual assembly builder deployer provided as a web service or other interface, which enables operations for uploading virtual assemblies to the repository, registering virtual assemblies with cloud components, and/or managing deployment instances defined by an assembly.

DETAILED DESCRIPTION

As described above, a cloud computing environment (cloud environment, or cloud) can be implemented in a variety of different ways to best suit different requirements: for example, public cloud, private cloud, community cloud, or hybrid cloud. A cloud computing model enables some of those responsibilities which previously may have been previously provided by an organization's own information technology department, to instead be delivered as service layers within a cloud environment, for use by consumers (either within or external to the organization, according to the cloud's public/private nature).

Described herein are a variety of hardware and/or software components and features, which can be used in delivering an infrastructure, platform, and/or applications to support cloud computing environments. In accordance with various embodiments, the system can also utilize hardware and software such as Oracle Exalogic and/or Exadata machines, WebLogic and/or Fusion Middleware, and other hardware and/or software components and features, to provide a cloud computing environment which is enterprise-grade, enables a platform for development and deploying applications, provides a set of enterprise applications built on modern architecture and use cases, and/or provides flexible consumption choices.

Figure 1:
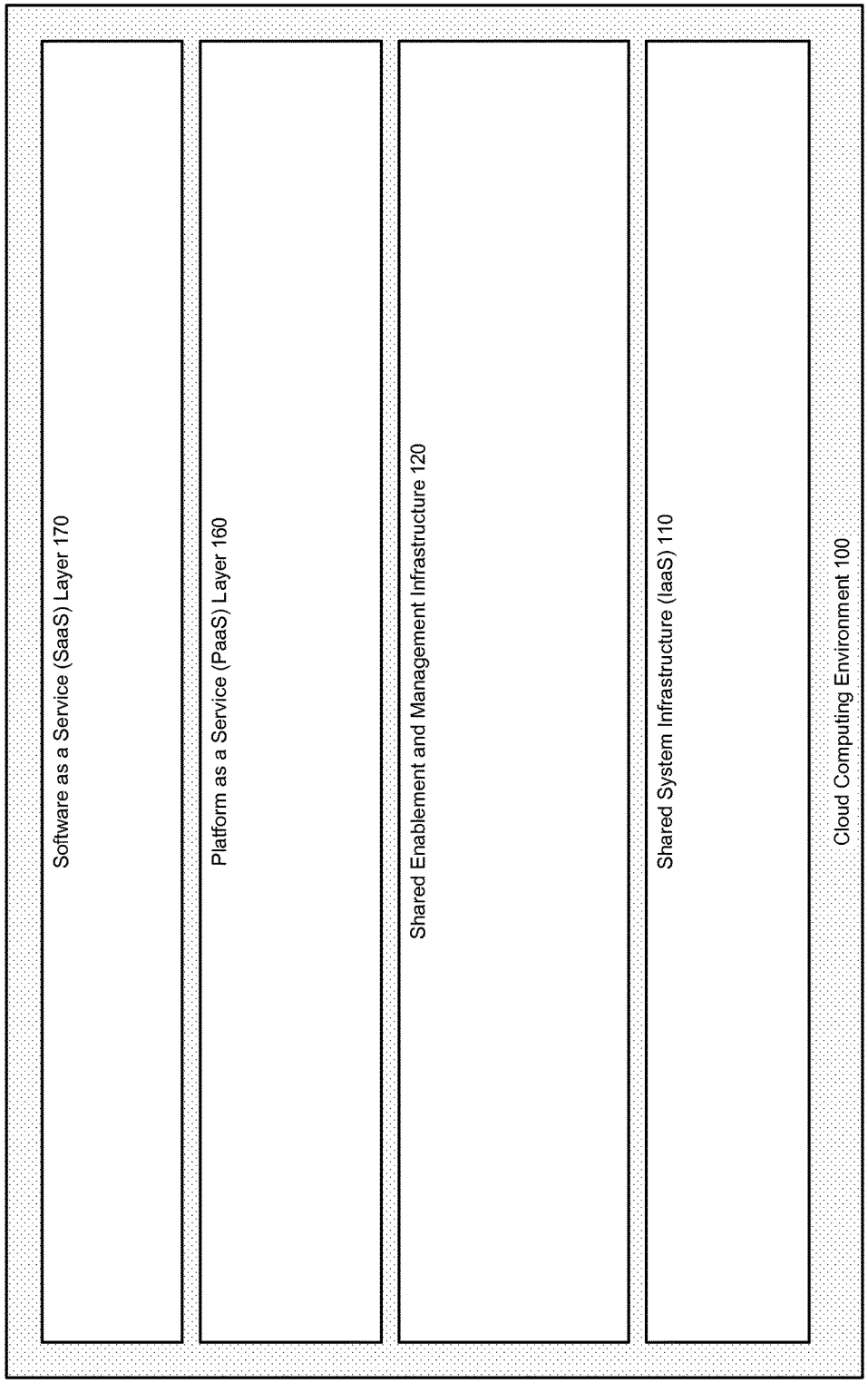
FIG. 1 illustrates a cloud computing environment including service layers, in accordance with an embodiment.

FIG. 1 illustrates a cloud computing environment including service layers, in accordance with an embodiment. As shown in FIG. 1, in accordance with an embodiment, a cloud computing environment (cloud environment, or cloud) 100 can generally include a combination of one or more Infrastructure as a Service (IaaS) layer 110, Platform as a Service (PaaS) layer 160, and/or Software as a Service (SaaS) layer 170, each of which are delivered as service layers within the cloud environment, and which can be used by consumers within or external to the organization, depending on the particular cloud computing model being used.

In accordance with an embodiment, the cloud computing environment can be implemented as a system that includes one or more conventional general purpose or specialized digital computers, computing devices, machines, microprocessors, memory and/or computer readable storage media, for example the computer hardware, software, and resources provided by Oracle Exalogic, Exadata, or similar machines.

As further shown in FIG. 1, in accordance with an embodiment, the cloud computing environment can include a shared enablement and management infrastructure 120, which is described in further detail below, and which provides enablement and management tools that can be used to support the various service layers.

The example shown in FIG. 1 is provided as an illustration of a type of cloud computing environment in which embodiments of the invention can generally be used. In accordance with various embodiments, the systems and methods described herein can also be used with different and/or other types of cloud or computing environments.

Figure 2:
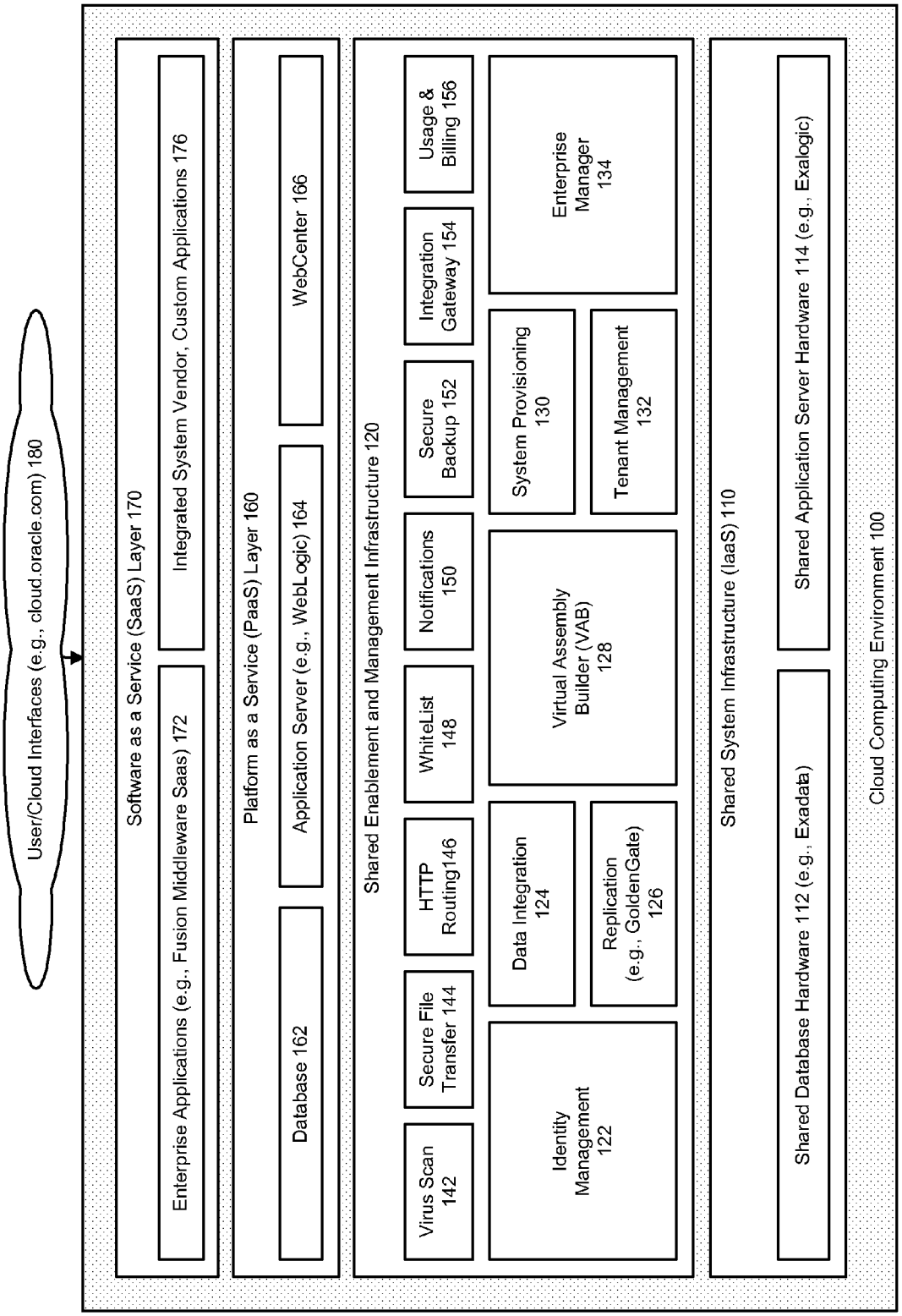
FIG. 2 further illustrates an environment, in accordance with an embodiment.

FIG. 2 further illustrates an environment, in accordance with an embodiment. As shown in FIG. 2, in accordance with an embodiment, each of the IaaS, PaaS, and/or SaaS layers can generally include a variety of components. For example, in accordance with an embodiment, the IaaS layer can include a shared database hardware (e.g., an Exadata machine) 112, and/or a shared application server hardware (e.g., an Exalogic machine) 114. The PaaS layer can include one or more PaaS services, such as a database service 162, application server service 164, and/or WebCenter service 166. The SaaS layer can include various SaaS services, such as enterprise applications (e.g., Oracle Fusion SaaS) 172, and/or ISV or custom applications 176, that can be accessed by one or more user/cloud interfaces 180.

As described above, in accordance with an embodiment, the cloud computing environment can also include a shared enablement and management infrastructure. For example, as shown in FIG. 2, the shared enablement and management infrastructure can include one or more identity management 122, data integration 124, replication (e.g., Oracle GoldenGate) 126, virtual assembly builder 128, system provisioning 130, tenant management 132, and/or enterprise manager components 134.

As further shown in FIG. 2, in accordance with an embodiment, the shared enablement and management infrastructure can also include other components, such as virus scan 142, secure file transfer 144, HTTP routing 146, whitelist 148, notifications 150, secure backup 152, integration gateway 154, and/or usage & billing 156 components.

The example shown in FIG. 2 is provided as an illustration of some of the types of components which can be included in a cloud computing environment, or within a shared enablement and management infrastructure. In accordance with other embodiments, different and/or other types or arrangements of components can be included.

Virtual Assembly Builder

Figure 3:
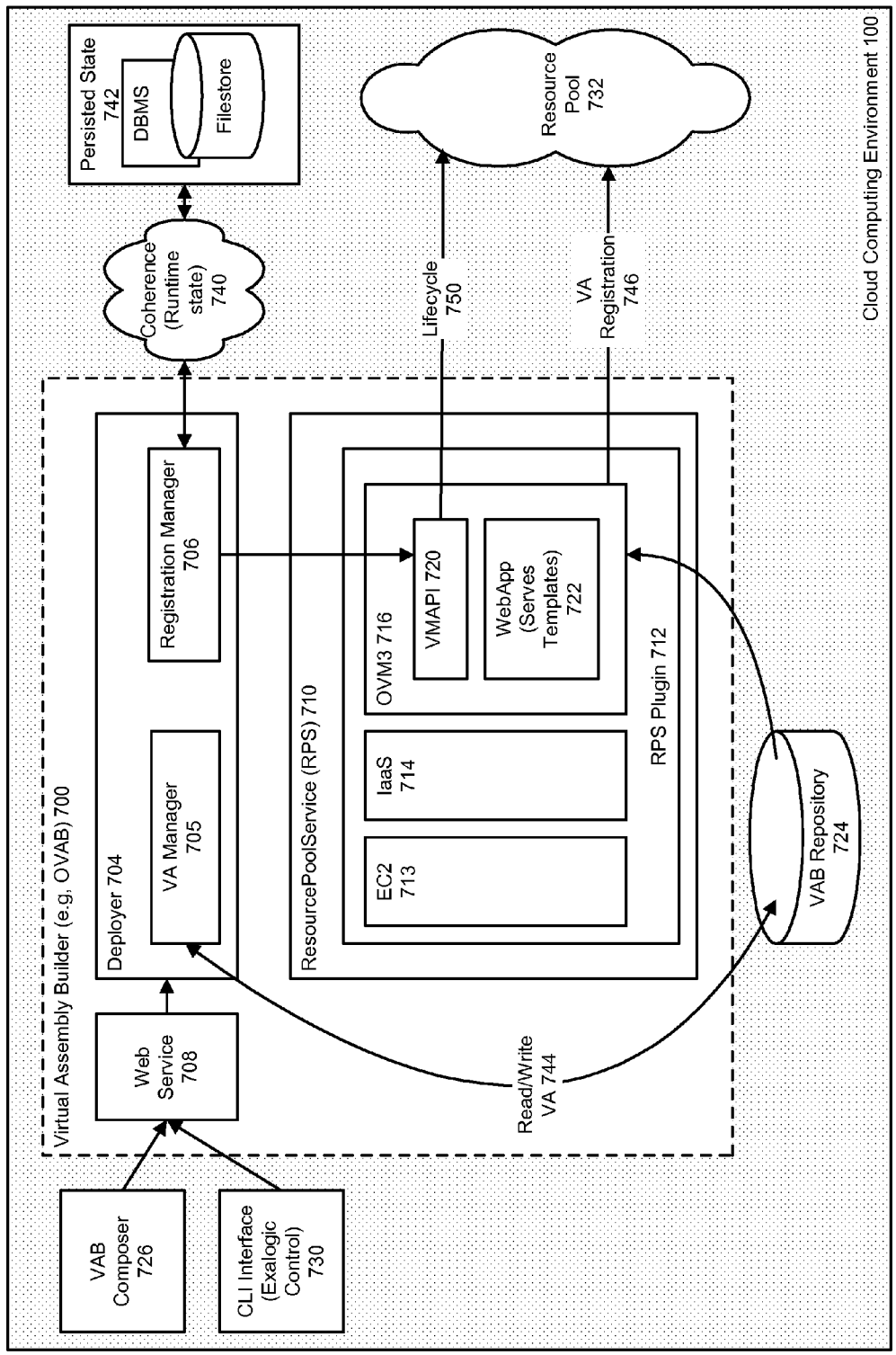
FIG. 3 illustrates a virtual assembly builder for use with a cloud computing environment, in accordance with an embodiment.

FIG. 3 illustrates a virtual assembly builder for use with a cloud computing environment, in accordance with an embodiment.

As shown in FIG. 3, in accordance with an embodiment, a virtual assembly builder component 700 (e.g., an Oracle Virtual Assembly Builder, OVAB) can be provided as an application (e.g., a Weblogic server or J2EE application) which maintains a repository 724 of virtual assembly (VA) archives. In accordance with an embodiment, the VA archives can be Oracle Virtual Assembly, (OVA) format archives.

In accordance with an embodiment, the virtual assemblies can be created using a composer 726, command line interface 730, editor or other product, such as OVAB Studio. The virtual assembly builder supports the use of operations for registering virtual assemblies with other components in a cloud environment, and/or managing deployment instances that are defined by an assembly archive.

In accordance with an embodiment, each virtual assembly can include a metadata, and one or more virtual machine templates, that can be used to instantiate an instance of that assembly. The virtual assembly builder includes a deployer component 704, which can be accessed, e.g., by way of a Web service or other type of interface 708, and which enables operations for uploading 744 virtual assemblies to the repository, and registering virtual assemblies with the cloud components, for their use in managing deployment instances.

In accordance with an embodiment, the deployer can be deployed as an instance within an application server or administration server, or as a set of instances within a collection of managed servers. Multi-instance embodiments can utilize a shared database or disk functionality 742, as provided by, e.g., Coherence, or a similar component, for storage of the deployer's runtime and configuration state 740. In accordance with an embodiment, the deployer interface can provide support for operations such as creating an assembly instance, or creating or updating targets.

In accordance with an embodiment, the virtual assembly builder deployer can also include a virtual assembly manager 705, for enabling access to the repository, and a registration manager 706 which provides access to a resource pool service (RPS) 710.

The resource pool service can support the use of one or more resource pool service plugins 712, for example, OVM3 716, IaaS 714, and/or EC2 713 plugins. In accordance with an embodiment, an OVM3 plugin can support the use of VMAPI 720, and templates 722, which enable the registration of assemblies 746 with a resource pool 732, and their subsequent lifecycle management 750.

Some virtualization systems allow tags to be associated with artifacts such as templates or VM instances. In accordance with an embodiment, these tags can then be queried by tools and cloud components interacting with the virtual assembly builder, to locate artifacts and/or to find relationships between artifacts, e.g., to find those artifacts that may be associated with a particular deployment.

As part of the virtual assembly builder's lifecycle, virtual assemblies can be uploaded to the deployer's repository, e.g., using an UploadAssemblyArchive operation. The uploaded virtual assembly can then be registered with one or more targets, e.g., using a RegisterAssemblyArchive operation.

Registration of an assembly archive includes uploading the virtual assembly to the repository, and registering its templates with a resource pool within the virtual assembly builder environment. After a virtual assembly has been registered with a target, one or more deployments can be created for that registration, e.g., using a CreateAssemblyinstance operation. In accordance with an embodiment, a deployment can be considered as providing a context that is used to manage the lifecycle of virtual machine instances for an assembly as defined by, e.g., its OVA configuration.

In accordance with an embodiment, once a deployment has been created for a virtual assembly, a deployment operation can be initiated.

During deployment, the initial instances for the assembly are created and started. While this is being performed, the deployer uses a rehydration logic which can be, e.g., embedded in the initialization scripts of those instances, and which configures various aspects of the assembly, such as the operating system, networks, or disk volumes. In accordance with an embodiment, the deployer also configures a virtual machine application stack for use within the environment. For example, information can be provided for configuring connections between service instances that are to be created when the application starts up.

Once a virtual assembly has been deployed, additional lifecycle operations can be applied to the running system, such as a Scale operation which can be used to increase or decrease the number of running instances for a particular appliance within an assembly. Operations can also be supported to, e.g., start or stop all instances of a deployment, or to allow other functionalities.

Example use of Virtual Assembly Builder with JCS

In accordance with an embodiment the virtual assembly builder component can be provided to support the use of service instance templates, provision service instances, and allow personalities to be assignment to service instances.

For example, in accordance with an embodiment, a cloud environment, such as Oracle Public Cloud (OPC), can include a Java cloud services (JCS) infrastructure, which allows a suite of software applications, middleware, and database offerings to be delivered to customers in a self-service, elastically scalable manner.

In accordance with an embodiment, the JCS infrastructure can orchestrate, in combination with other cloud environment components, the creating and/or updating of a platform instance of a Java cloud service (Java service), including provisioning and deployment of the platform instance and/or deployment of software applications, and one or more personality injection or application deployment processing. Additional resources and/or services, such as a database service, can be wired to or otherwise associated with the Java cloud service, for use by customer applications that are deployed to the cloud.

In accordance with an embodiment, the JCS infrastructure enables cloud customers to obtain a dedicated set of application server (e.g., J2EE, or WebLogic) instances, based on a subscription level. In accordance with an embodiment, server instances can run in their own virtual machine (VM) instance, and a virtual assembly builder component (e.g., OVAB) can be used for deployment and teardown of service instances. In accordance with an embodiment, customers can be associated with one or more tenants and/or one or more Java cloud service subscriptions, and instances can be provisioned based on the subscription configuration. Incoming requests can be, e.g., load-balanced to HTTP servers, and routed to appropriate tenants and instances.

Functionally, the JCS infrastructure allows for the self-service provisioning of Java cloud service instances. Once provisioned, a customer's service administrators can interact with the service by, e.g. deploying EAR and WAR files, as they would to a traditional non-cloud application server environment, subject to certain cloud-provider guidelines, such as application whitelist validation.

In accordance with an embodiment, a Java cloud service instance can be a WebLogic Server (WLS) based Java EE application server. In accordance with such embodiments, each tenant receives a dedicated set of WLS server instances that include a WLS administration server and one or a plurality of managed servers based on their subscription level. These servers are run within their own virtual machine (VM) instance, which allows the use of virtual assembly builder components and products, such as Oracle Virtual Assembly Builder assemblies, to be used for the quick and flexible deployment and teardown of service instances. In accordance with an embodiment, tenants also receive their own database schema.

Figure 4:
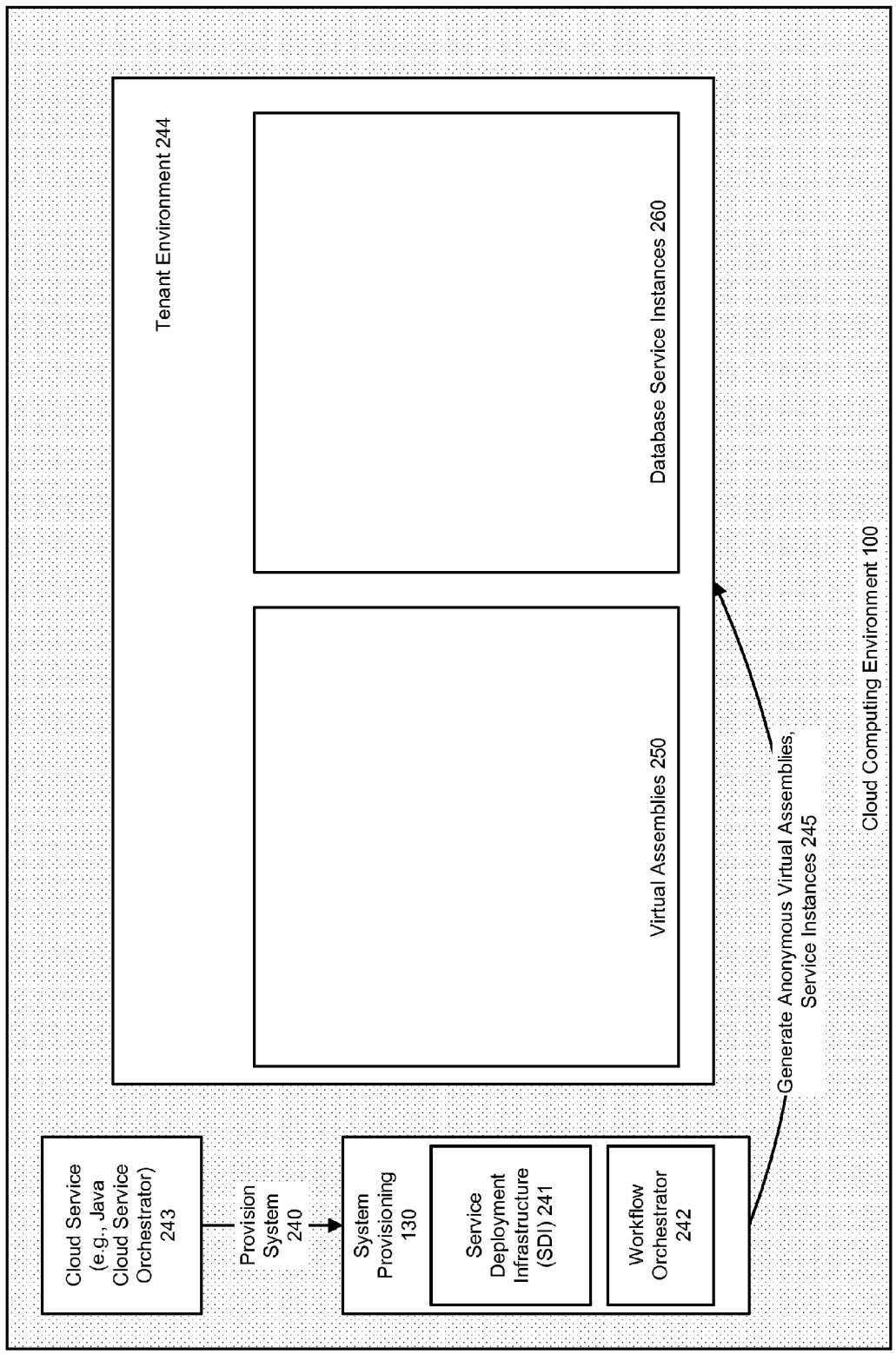
FIG. 4 illustrates how an environment that includes a Java cloud service can use virtual assemblies, in accordance with an embodiment.

FIG. 4 illustrates how an environment that includes a Java cloud service can use virtual assemblies, in accordance with an embodiment. As shown in FIG. 4, a tenant environment is created 244, by generating 245 virtual assemblies 250 and/or service instances 260. Initially, virtual assemblies and service instances will be anonymous. They will receive personalities later in the process.

Figure 5:
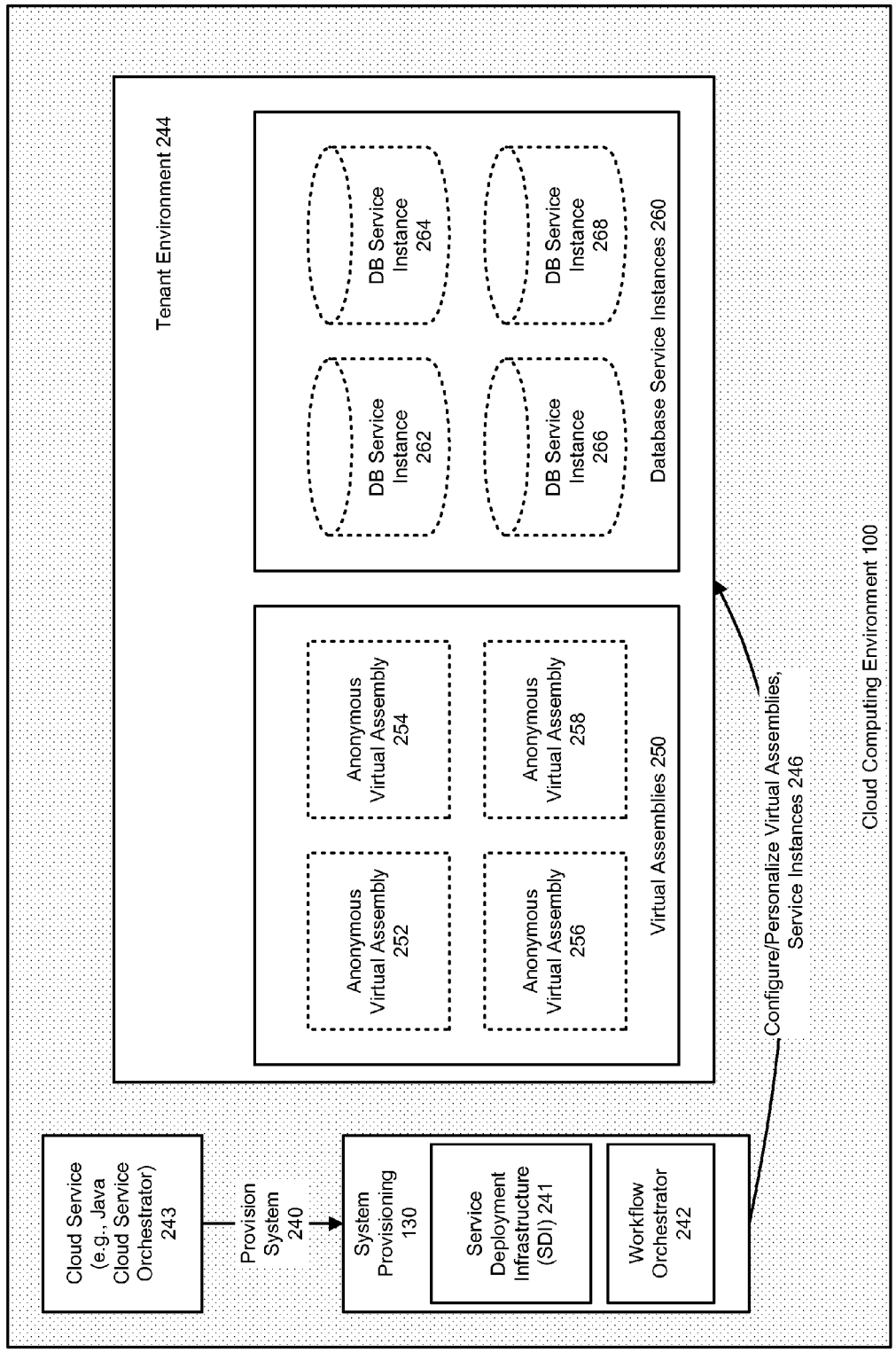
FIG. 5 further illustrates the use of virtual assemblies, in accordance with an embodiment.

FIG. 5 further illustrates the use of virtual assemblies, in accordance with an embodiment. As shown in FIG. 5, the system can create a plurality of anonymous virtual assemblies 252, 254, 256, 258 and service instances (in this example, database service instances 262, 264, 266, 268). In accordance with an embodiment, a tenant receives a dedicated set of application server (e.g. WLS) server instances and one or a plurality of managed servers based on their subscription level, wherein each server runs within its own virtual machine (VM) instance. Each of the assemblies and/or service instances can then be configured 246 to meet the order requirements.

Figure 6:
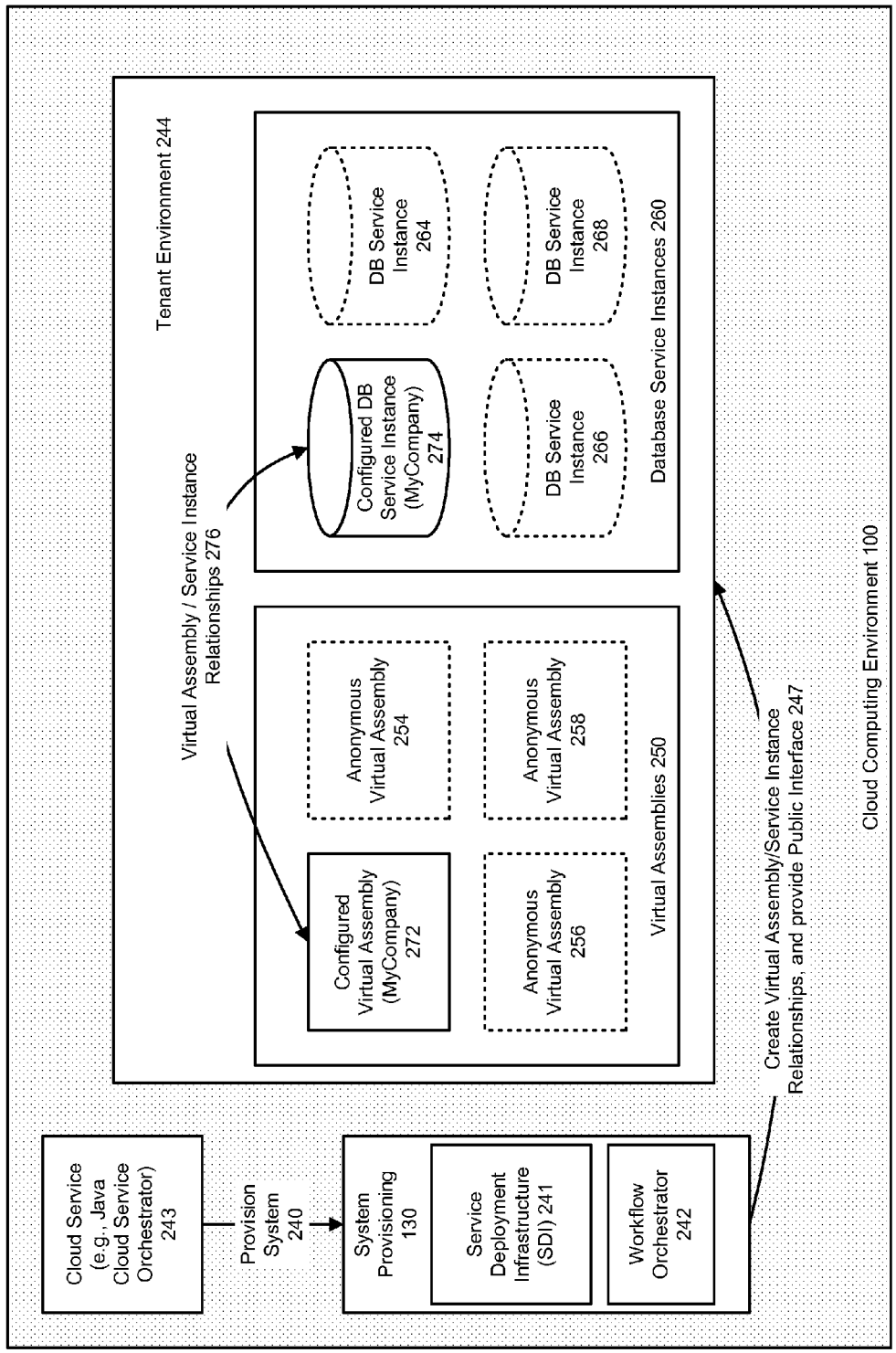
FIG. 6 further illustrates the use of virtual assemblies, in accordance with an embodiment.

FIG. 6 further illustrates the use of virtual assemblies, in accordance with an embodiment. As shown in FIG. 6, a particular virtual assembly 272 and/or particular service instance 274 is configured to suit the order (e.g. MyCompany), and at the same time its public interfaces are created 247. For example, in the context of a Java cloud service, the resultant platform instance will contain all of those resources that are required to provide a WebLogic or other application server service, for a given tenant according to their order, including, e.g., an instance database, administration server, and one or more application servers. Each of the configured virtual assembly can include a relationship 276 to a service instance.

Figure 7:
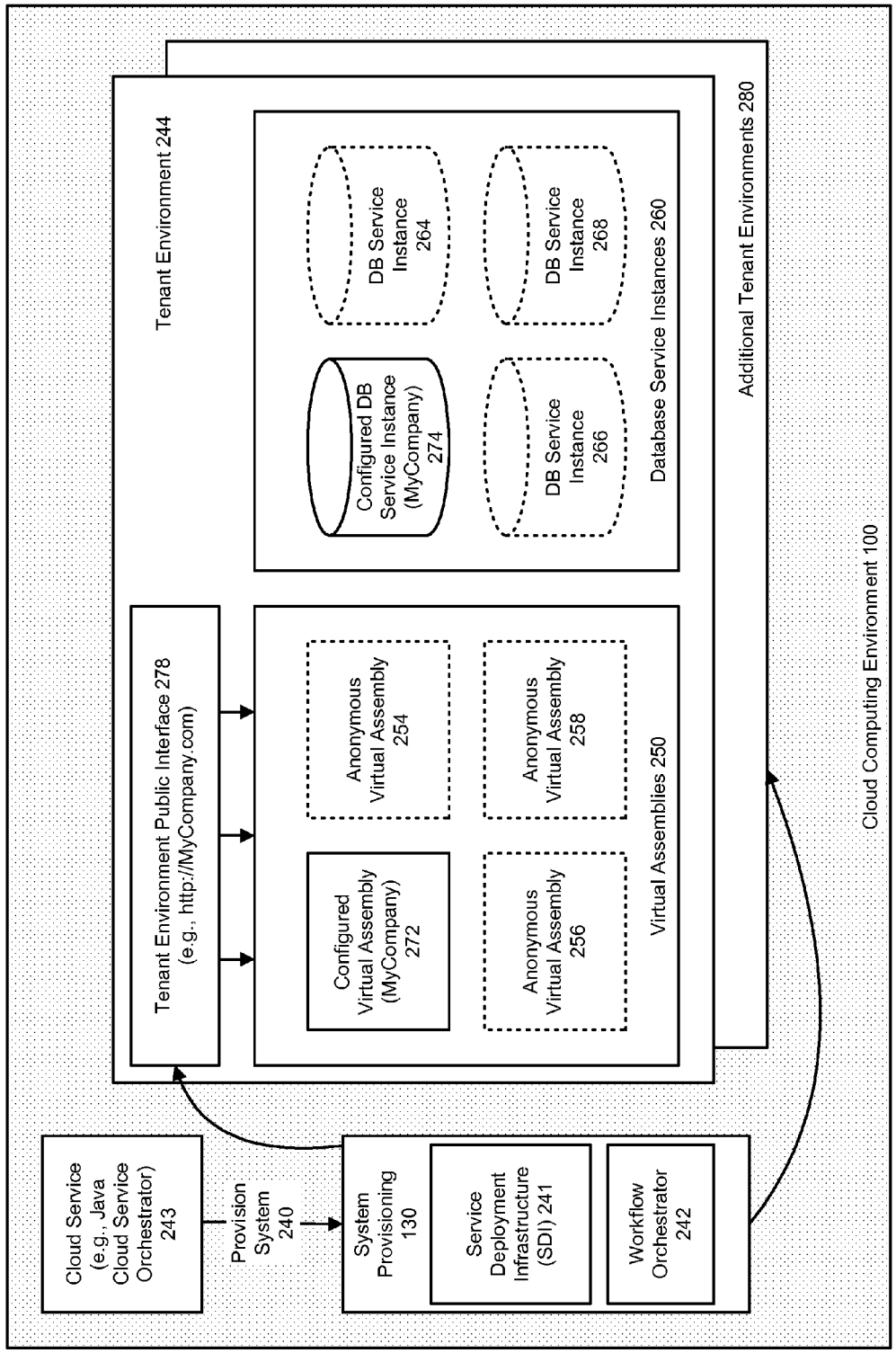
FIG. 7 further illustrates the use of virtual assemblies, in accordance with an embodiment.

FIG. 7 further illustrates the use of virtual assemblies, in accordance with an embodiment. As shown in FIG. 7, a public interface is created 278 for use by the tenant (e.g. http://MyCompany.com). The process can be repeated for other tenants 280. Incoming requests can then be, e.g., load-balanced to HTTP servers, and routed to appropriate tenants and instances.

Although the above example describes how the virtual assembly builder component can be used in combination with a JCS infrastructure and other components, such as TAS and SDI, to create Java service platform instances; in accordance with other embodiments, the virtual assembly builder component can be similarly used with other components within a cloud environment, to create or provision other types of services or platform instances.

Figure 8:
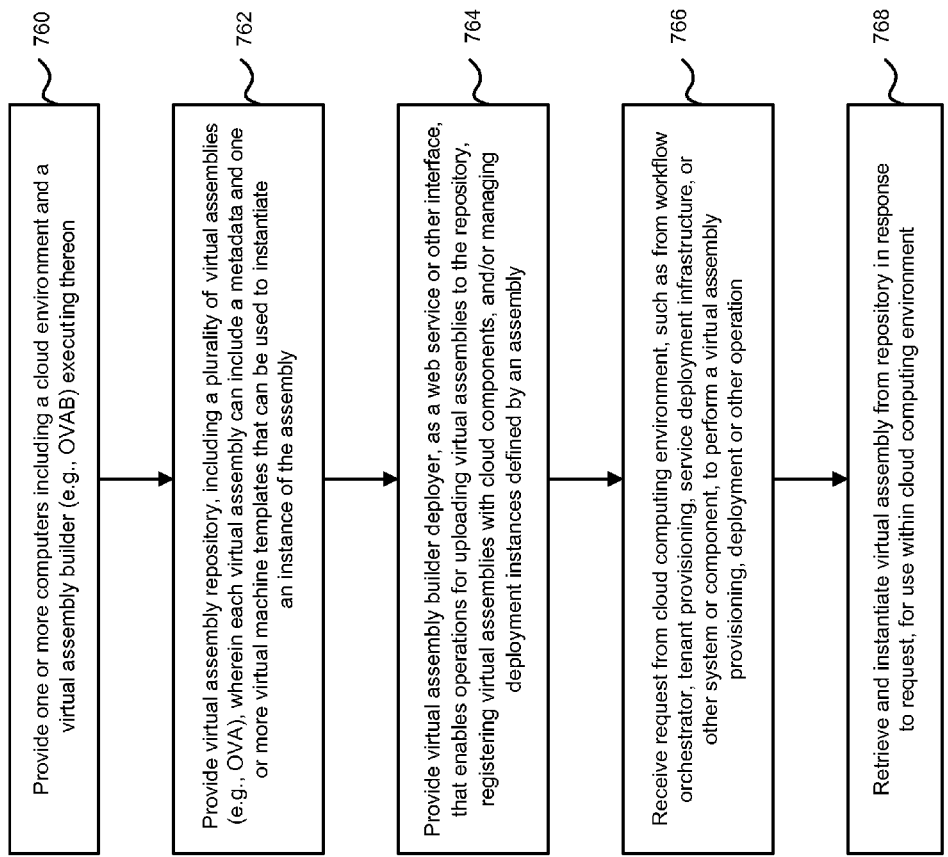
FIG. 8 is a flowchart that illustrates a method of using a virtual assembly builder with a cloud computing environment, in accordance with an embodiment.

FIG. 8 is a flowchart that illustrates a method of using a virtual assembly builder with a cloud computing environment, in accordance with an embodiment. As shown in FIG. 8, in accordance with an embodiment, at step 760, one or more computers are provided, including a cloud environment and a virtual assembly builder (e.g., OVAB) executing thereon.

At step 762, a virtual assembly repository is provided, including a plurality of virtual assemblies (e.g., OVA), wherein each virtual assembly can include a metadata and one or more virtual machine templates that can be used to instantiate an instance of the assembly.

At step 764, a virtual assembly builder deployer is provided, as a web service or other interface, which enables operations for uploading virtual assemblies to the repository, registering virtual assemblies with cloud components, and/or managing deployment instances defined by an assembly.

At step 766, the deployer receives requests from a cloud computing environment, such as from a workflow orchestrator, tenant provisioning, service deployment infrastructure, or other system or component, to perform a virtual assembly provisioning, deployment or other operation.

At step 768, the virtual assembly builder retrieves and instantiates a virtual assembly from repository in response to request, for use within the cloud computing environment.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing a virtual assembly builder for use with a cloud computing environment, comprising:
   one or more computers, including a processor and a cloud computing environment executing thereon that supports provisioning of services;
   a virtual assembly builder component, which maintains a repository of virtual assembly archives, wherein each virtual assembly archive includes and is associated with one or more templates that enable registration and deployment of instances of its associated virtual assembly; and
   a deployer component, which is accessible by an interface, and enables operations for uploading virtual assemblies to the repository as virtual assembly archives, registering the virtual assemblies with target cloud components, and managing deployed instances of the virtual assemblies;
   wherein the deployer component provides access to a resource pool service and controls registration and deployment of the virtual assembly archives to resource pools, including that
      during registration of a particular virtual assembly archive, that is associated with a particular virtual assembly and includes one or more templates that enable registration and deployment of the particular virtual assembly, the particular virtual assembly archive and its one or more templates are registered with a resource pool, via the resource pool service, and
      subsequently, in response to receiving a request to provision an instance of the particular virtual assembly, to be provided within the cloud computing environment, the instance of the particular virtual assembly is
         created and deployed to the resource pool, and
         configured by the deployer component in accordance with the request and one or more initialization scripts associated with the instance of the particular virtual assembly,
      wherein the instance of the particular virtual assembly is thereafter managed via the interface and operations provided by the deployer component.

2. The system of claim 1, wherein the deployer component receives requests from a cloud computing environment, such as from a workflow orchestrator, tenant provisioning, service deployment infrastructure, or other system or component, to perform a virtual assembly provisioning, deployment or other operation, and wherein the virtual assembly builder retrieves and instantiates a virtual assembly from the repository in response to the request, for use within the cloud computing environment.

3. The system of claim 1, wherein the virtual assembly builder includes a resource pool service and one or more resource pool service plugins.

4. The system of claim 1, wherein during deployment, initial instances for the assembly are created and started, and the deployer component uses a rehydration logic which can be embedded in the initialization scripts of those instances, and which configures various aspects of the assembly, such as the operating system, networks, or disk volumes.

5. The system of claim 4, wherein during deployment, the deployer component also configures a virtual machine application stack for use within the environment, including configuring connections between instances that are created when the application starts up.

6. The system of claim 1, wherein a deployment of an instance of a virtual assembly provides a context for managing a lifecycle of virtual machine instances for that virtual assembly, including application of lifecycle operations.

7. The system of claim 1, wherein registration of a particular virtual assembly archive includes registering its templates with a resource pool target, wherein after the virtual assembly archive has been registered with the resource pool target, one or more deployments can be created for that registration, at the resource pool target.

8. The system of claim 7, wherein the resource pool service includes a plurality of resource pool service plugins, including a plugin for use with each of a plurality of virtualization systems, wherein during registration of the particular virtual assembly archive by the deployer component at the resource pool target, a particular resource pool service plugin is selected, based on a target virtualization system.

9. A method of providing a virtual assembly builder for use with a cloud computing environment, comprising:
providing, at one or more computers, including a processor and a cloud computing environment executing thereon, a virtual assembly builder component, which maintains a repository of virtual assembly archives, wherein each virtual assembly archive includes and is associated with one or more templates that enable registration and deployment of instances of its associated virtual assembly; and
providing a deployer component, which is accessible by an interface, and enables operations for uploading virtual assemblies to the repository as virtual assembly archives, registering the virtual assemblies with target cloud components, and managing deployed instances of the virtual assemblies;
wherein the deployer component provides access to a resource pool service and controls registration and deployment of the virtual assembly archives to resource pools, including that
during registration of a particular virtual assembly archive, that is associated with a particular virtual assembly and includes one or more templates that enable registration and deployment of the particular virtual assembly, the particular virtual assembly archive and its one or more templates are registered with a resource pool, via the resource pool service, and
subsequently, in response to receiving a request to provision an instance of the particular virtual assembly, to be provided within the cloud computing environment, the instance of the particular virtual assembly is
created and deployed to the resource pool, and
configured by the deployer component in accordance with the request and one or more initialization scripts associated with the instance of the particular virtual assembly,
wherein the instance of the particular virtual assembly is thereafter managed via the interface and operations provided by the deployer component.

10. The method of claim 9, wherein the deployer component receives requests from a cloud computing environment, such as from a workflow orchestrator, tenant provisioning, service deployment infrastructure, or other system or component, to perform a virtual assembly provisioning, deployment or other operation, and wherein the virtual assembly builder retrieves and instantiates a virtual assembly from the repository in response to the request, for use within the cloud computing environment.

11. The method of claim 9, wherein the virtual assembly builder includes a resource pool service and one or more resource pool service plugins.

12. The method of claim 9, wherein during deployment, initial instances for the assembly are created and started, and the deployer component uses a rehydration logic which can be embedded in the initialization scripts of those instances, and which configures various aspects of the assembly, such as the operating system, networks, or disk volumes.

13. The method of claim 12, wherein during deployment, the deployer component also configures a virtual machine application stack for use within the environment, including configuring connections between instances that are created when the application starts up.

14. The method of claim 9, wherein a deployment of an instance of a virtual assembly provides a context for managing a lifecycle of virtual machine instances for that virtual assembly, including application of lifecycle operations.

15. A non-transitory computer readable medium, including instructions stored thereon which when read and executed by one or more computers cause the one or more computers to perform the steps comprising:
providing, at one or more computers, including a cloud computing environment executing thereon, a virtual assembly builder component, which maintains a repository of virtual assembly archives, wherein each virtual assembly archive includes and is associated with one or more templates that enable registration and deployment of instances of its associated virtual assembly; and
providing a deployer component, which is accessible by an interface, and enables operations for uploading virtual assemblies to the repository as virtual assembly archives, registering the virtual assemblies with target cloud components, and managing deployed instances of the virtual assemblies;
wherein the deployer component provides access to a resource pool service and controls registration and deployment of the virtual assembly archives to resource pools, including that
during registration of a particular virtual assembly archive, that is associated with a particular virtual assembly and includes one or more templates that enable registration and deployment of the particular virtual assembly, the particular virtual assembly archive and its one or more templates are registered with a resource pool, via the resource pool service, and subsequently, in response to receiving a request to provision an instance of the particular virtual assembly, to be provided within the cloud computing environment, the instance of the particular virtual assembly is created and deployed to the resource pool, and configured by the deployer component in accordance with the request and one or more initialization scripts associated with the instance of the particular virtual assembly, wherein the instance of the particular virtual assembly is thereafter managed via the interface and operations provided by the deployer component.

16. The non-transitory computer readable medium of claim 15, wherein the deployer component receives requests from a cloud computing environment, such as from a workflow orchestrator, tenant provisioning, service deployment infrastructure, or other system or component, to perform a virtual assembly provisioning, deployment or other operation, and wherein the virtual assembly builder retrieves and instantiates a virtual assembly from the repository in response to the request, for use within the cloud computing environment.

17. The non-transitory computer readable medium of claim 15, wherein the virtual assembly builder includes a resource pool service and one or more resource pool service plugins.

18. The non-transitory computer readable medium of claim 15, wherein during deployment, initial instances for the assembly are created and started, and the deployer component uses a rehydration logic which can be embedded in the initialization scripts of those instances, and which configures various aspects of the assembly, such as the operating system, networks, or disk volumes.

19. The non-transitory computer readable medium of claim 18, wherein during deployment, the deployer component also configures a virtual machine application stack for use within the environment, including configuring connections between instances that are created when the application starts up.

20. The non-transitory computer readable medium of claim 15, wherein a deployment of an instance of a virtual assembly provides a context for managing a lifecycle of virtual machine instances for that virtual assembly, including application of lifecycle operations.

\* \* \* \* \*

UNITED STATES PATENT AND TRADEMARK OFFICE
CERTIFICATE OF CORRECTION

PATENT NO. : 10,061,602 B2
APPLICATION NO. : 14/020598
DATED : August 28, 2018
INVENTOR(S) : Mousseau Page 1 of 1

It is certified that error appears in the above-identified patent and that said Letters Patent is hereby corrected as shown below:

In the Specification

In Column 1, Line 16, delete "2012;and" and insert -- 2012; and --, therefor.

Signed and Sealed this
Sixteenth Day of July, 2019

Andrei Iancu
*Director of the United States Patent and Trademark Office*